United States Patent [19]

Pettingell et al.

[11] Patent Number: 4,601,551
[45] Date of Patent: Jul. 22, 1986

[54] MANIPULATION OF EMBRYOS AND OVA

[75] Inventors: James T. Pettingell, Escondido; T. Charles Podvin, Poway, both of Calif.

[73] Assignee: The Micromanipulator Microscope Company, Inc., Escondido, Calif.

[21] Appl. No.: 573,054

[22] Filed: Jan. 23, 1984

[51] Int. Cl.$^4$ .............................................. G02B 21/06
[52] U.S. Cl. .................................... 350/525; 350/523
[58] Field of Search ............. 350/507, 512, 514, 515, 350/1.6, 272, 523, 525, 526, 529, 318

[56] References Cited

U.S. PATENT DOCUMENTS

| | | | |
|---|---|---|---|
| 2,415,732 | 2/1947 | Domingo | 350/525 |
| 3,414,345 | 12/1968 | Möllring | 350/523 |
| 3,639,039 | 2/1972 | Rhodes, Jr. | 350/272 |
| 3,740,147 | 6/1973 | Kallet | 350/525 |
| 3,849,649 | 11/1974 | Carey | 350/272 |
| 3,920,311 | 11/1975 | Tsuda et al. | 350/525 |
| 4,030,833 | 6/1977 | Barbieri | 350/318 |
| 4,270,838 | 6/1981 | Furusawa et al. | 350/525 |
| 4,298,005 | 11/1981 | Mutzhas | 350/1.6 |

Primary Examiner—John K. Corbin
Assistant Examiner—Loha Ben
Attorney, Agent, or Firm—Fitch, Even, Tabin & Flannery

[57] ABSTRACT

Embryos and ova are manipulated at a work station that includes a microscope, a stage positioned below the objective the microscope on which an embryo- or ovum-containing sample is placed and micromanipulators and associated tools for operating on or otherwise manipulating the embryo or ovum. The specimen is illuminated with both bright-field illumination and dark-field illumination of contrasting hue to produce a composite image of the embryos or ova with the embryos or ova glowing with the dark-field hue against a bright background. The bright-field is transmitted through an aperture that is narrow to obtain a depth of field that is appropriate to three-dimensional manipulation.

17 Claims, 9 Drawing Figures

FIG. 6
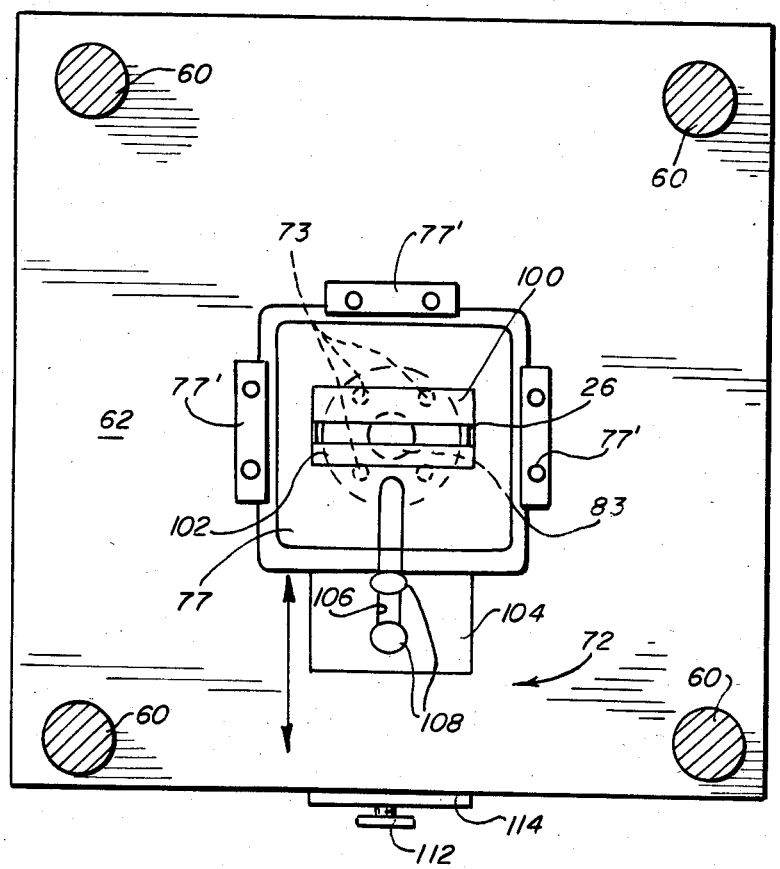
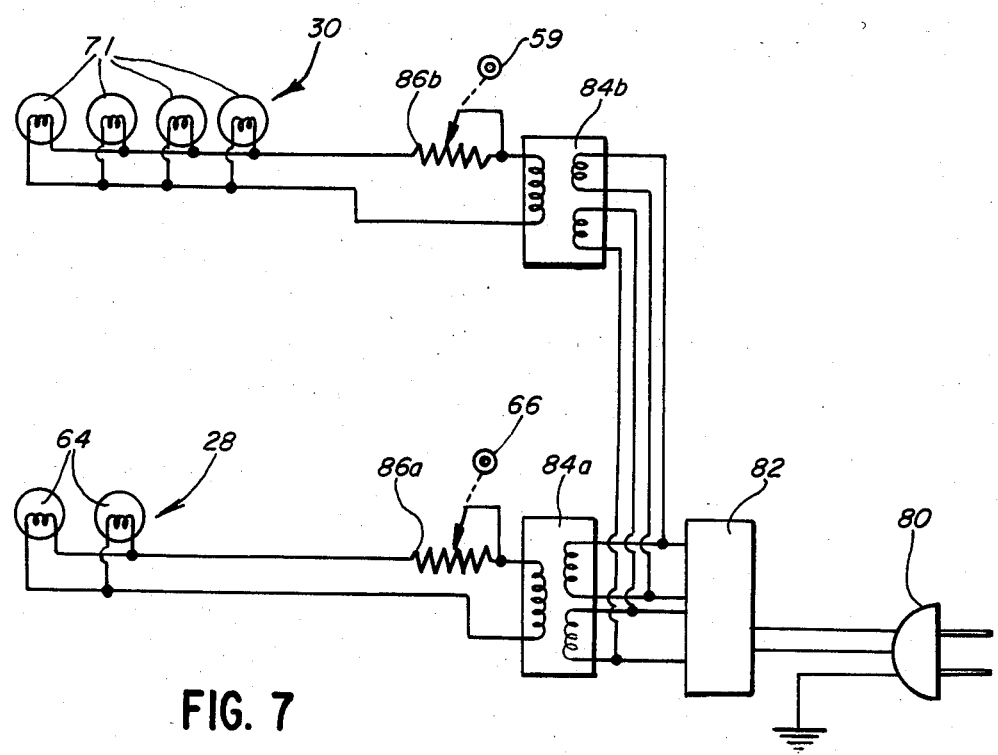
FIG. 7

MANIPULATION OF EMBRYOS AND OVA

The present invention relates to methods and apparatus for detecting and manipulating embryos and ova.

Manipulation of embryos for various animal breeding purposes is being used to an increasing extent by both scientists and animal breeders. At the present time there exists an embryo transfer business that is grossing about 25 million dollars a year. In embryo transfer, an embryo is extracted from an impregnated female animal and implanted in a host mother of the same species. The animal from which the embryo was removed soon ovulates again and can be again impregnated. Alternatively, the animal may be induced to produce several ova that may be extracted, fertilized in vitro and implanted in a recipient animal. Ether of these procedures permits an especially valuable female animal, such as a cow, to produce multiple offspring each year. Recently, it has been found that embryos that are in the early stage of development before the cells have differentiated e.g., containing up to about 64 cells, can be split into two or more pieces that can each come to full term when transplanted into host mothers. This technique is expected to greatly enhance the value of the embryo transfer technique.

Another embryo manipulation technique expected to have commercial importance is the production of mosaic animals. In this technique, cells from one embryo are introduced into the cell mass of another embryo. The resulting animal will have a mixture of characteristics resulting from the genetic material of both sets of cells. Recently, introduction of foreign genetic material into the egg cell through microinjection has been described, with the resulting animal expressing the characteristics of the foreign genetic material.

Embryo manipulation requires exacting instrumentation, including a microscope that permits the technician to view the embryo and to manipulate tools to operate on the embryo.

Apparatus for manipulating embryos or ova is presently commercially available, e.g., from Leitz. This apparatus includes a microscope and a pair of micromanipulators that clamp and manipulate various tools that hold, cut, move, and inject embryonic cells. While amazing biological feats have been performed using currently available apparatus, there remains a need for improved apparatus, particularly apparatus that better enables the technician to view the embryos or ova which he is manipulating. A specimen that contains an extracted embryo or ovum also contains numerous coextracted cells, particularly blastomeres, and the first task of the technician is to locate the embryo or an ovum from amongst the superfluous cells. Embryos and ova can be distinguished from blastomeres by their size, which even at the single cell fertilized egg stage are larger than the blastomeres, and furthermore, by a distinctive protective layer that surrounds the embryo or ovum known as the zona pellucida and which is visible under the microscope. Nevertheless, locating an embryo or ovum from amidst a large number of cumulus cells is a tedious task. Clear visibility of the embryos or ova is understandably important in manipulation techniques in which the technician, through the use of micromanipulators, carefully manipulates the tools relative to particular features of the embryo. Unlike cells that are examined for pathological purposes, it is generally not consistent with their continued viability to stain embryos or ova, and features of unstained embryos and ova are often difficult to discern.

It is primary object of the present invention to improve embryo surgical techniques by providing methods and apparatus for more clearly viewing embryos so that the embryo may be more quickly identified and more precisely manipulated. In addition, the invention enables ova to be detected more quickly from within a mass of cumulus cells. A further benefit of the apparatus is to facilitate in vitro fertilization.

The present invention provides an embryo or ovum manipulation station that includes a microscope, a pair of micromanipulators including appropriate associated surgical tools and an illumination system that produces an image of the embryo or ovum that better enables a technician to locate an embryo or ovum and to manipulate an embryo or an ovum. The illumination system comprises a combination of transmitted bright-field illumination and transmitted dark-field illumination which are each adjustable in intensity to maximize visibility of the embryo or ovum and/or to obscure the image of extraneous cellular material relative to the image of the embryos or ova. Contrasting color is provided to enhance the image of the embryos or ova by filtering the light from the dark-field source through an appropriate filter, preferably in the red to orange range of the spectrum. Improved depth of field and contrast of the image is achieved through the use of means to narrow the aperture or slit through which the transmitted bright field illumination passes. The slit adjustment means may be quickly removed from the light path for normal bright-field illumination.

These and other advantages of the present invention will become more clear with reference to the accompanying drawings in which:

FIG. 6 is a plan view of the aperture adjustmnt system; and

FIG. 7 is a simplified electrical diagram of the illuminator means.

Figure 1:
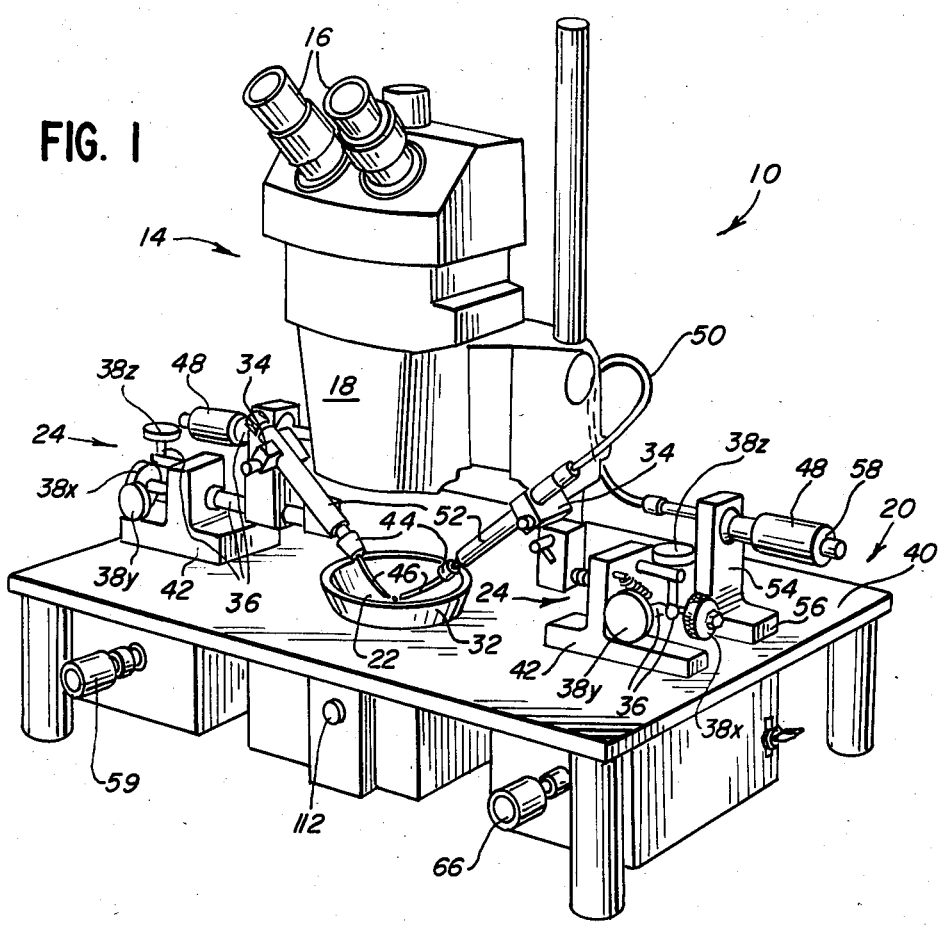
FIG. 1 is a perspective view of an embryo manipulation work station embodying various features of the present invention.

Illustrated in FIG. 1 is a microsurgical station 10 for manipulating embryos 12 (FIG. 3), e.g., to cut embryos to produce twin embryos, to introduce foreign cells into an embryo cell mass or to inject foreign genetic material into the egg cell. (The invention will be described herein primarily in terms of detecting and manipulating embryos although it is to be understood that the apparatus is also useful for viewing ova and for manipulating ova.) The station 10 includes a microscope 14, which preferably and as illustrated, is a stereo-microscope in order to ease eye strain during protracted viewing and to provide an image with good depth perspective. The microscope 14 is equipped with a dual eye piece 16 and a long working distance objective 18 that provides working space below the objective for embryo manipulation. Below the objective 18 is a stage 20 on which a specimen 22 is mounted and on which micromanipulators 24 are positioned adjacent to the specimen. The stage 20 has an aperture or slit 26 (FIG. 6) through which light from illuminator means 28, 30 (FIG. 4) disposed below the stage 20 passes to illuminate the specimen 22. Surgery may be performed on an embryo 12 contained in an open petri dish 32 placed on the stage 20 over the aperture 26.

Positioned on the stage 20 flanking the specimen-containing petri dish 32 are a pair of micromanipulators 24, such as Model MM 110 R micromanipulators sold by MxM Microscope Company. These manipulators 24 each include a clamp 34 for holding a surgical tool and various threaded means 36 for moving the clamp in the X, Y and Z directions. A clamp-held tool 44 can be moved in any of these directions to a resolution of movement below a micron by appropriate turning of X, Y and Z directional knobs 38X, 38Y, and 38Z of the micromanipulators. In a preferred embodiment, the upper plate 40 of the stage 20 is formed of metal and the base 42 of each micromanipulator 24 is strongly magnetic for holding the micromanipulations firmly to the upper plate after being positioned by the technician relative to the specimen 22. Although with application of sufficient force, the manipulators 24 can each be slid along the upper plate 40 for repositioning, the magnetic bases 42 provide for sufficiently secure placement of the manipulators on the upper plate 40 that ordinary manipulations of the knobs 38 will not shift the manipulator positions on the stage.

Figure 3:
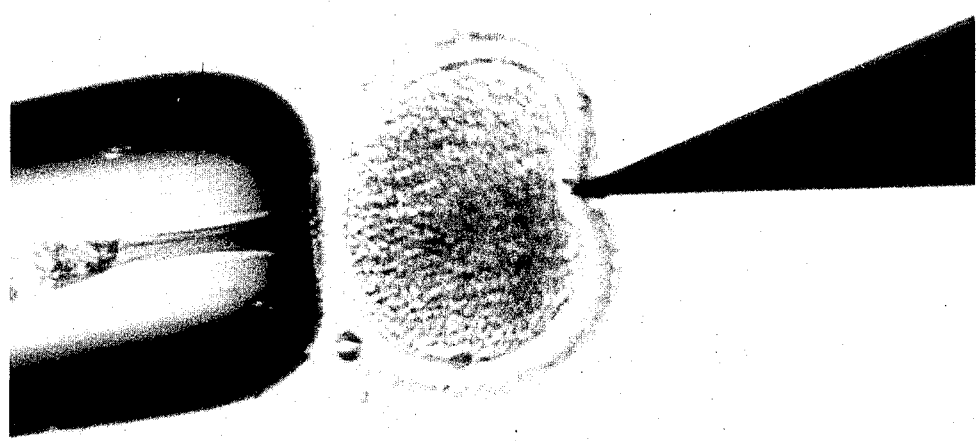
FIG. 3 is a microscopic photo of an embryo being held by an aspirating probe and cut with a microsurgical blade.

The manipulating tools illustrated in FIG. 1 are micropipettes 44 that each include a probe 46 and a separate dispenser 48 communicated with the probes by a tubing system 50. The probes 46 are inserted through tubular holders 52 that are, in turn, held by the clamps 34 of the micromanipulators 24. The dispensers 48 are each clamped into free-standing retainer assemblies 54, which like the micromanipulators 24 have magnetic bases 56 for positioning on the stage. The dispensers 48 each have a knob 58 by which a positive or negative fluid pressure may be created and transferred to the probe 46. Generally one of the tools used in embryo surgery is such a pipette having a probe 46a, such as that shown in FIG. 3, which holds the embryo through a negative pressure. The other tool may be another such pipette, as is illustrated in FIG. 1, having a probe suitable for injecting material into the cell, or the second tool may be a blade 44c or other penetrating tool for cutting the embryo into parts as is shown in FIG. 3.

In accordance with the present invention, in an embryo microsurgical work station 10 that includes a microscope 14 having an eye piece 16 and an objective 18, a stage 20 dispose below the microscope objective on which a specimen 22 is placed for viewing and micromanipulator means 24 with associated tool means 44 for manipulating the embryo as it is viewed through the microscope, the specimen is illuminated both by a bright-field illuminator means 28 and a dark-field illuminator means 30 of contrasting hue, whereby a composite microscopic image includes of the viewed image both a bright-field and a dark-field component. Associated with the bright-field and dark-field illuminator means 28, 30 are means, generally represented in FIG. 1 by adjustment knobs 59, 66, for independently adjusting their intensities over their light output ranges, whereby visibility and contrast of the composite embryo image can be optimized by the operator and/or the embryo image can be enhanced relative to other cellular material in the specimen.

Figures 2A, 2B, 2C:
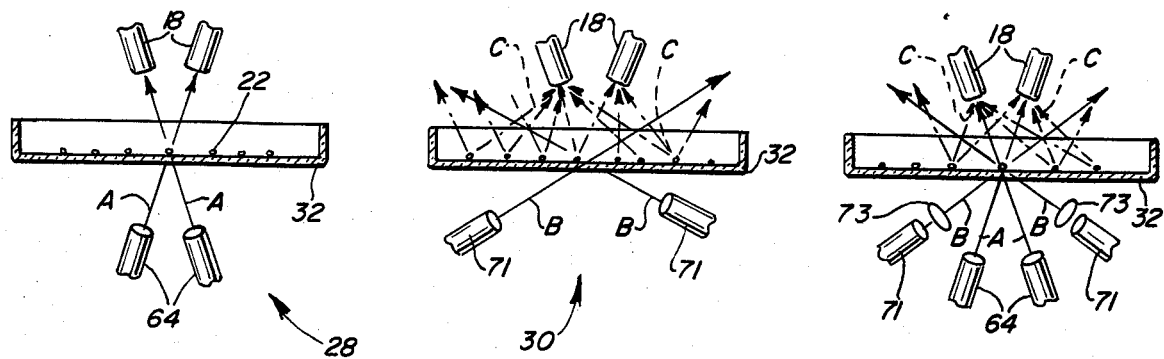
FIG. 2A is a diagrammatic illustration of transmitted bright-field illumination.
FIG. 2B is a diagrammatic illustration of transmitted dark-field illumination.
FIG. 2C is a diagrammatic illustration of a combined transmitted bright-field and colored transmitted dark-field embodying various features of the present invention.

Illustrated in FIG. 2A is a diagrammatic illustration of a transmitted bright-field illuminator 28 with respect to a stereo-microscope 14. The specimen 22 is disposed on the stage 20 between the microscope objective 18 and a pair of light sources 64 that emit light rays A (e.g., white light) toward the objectives of the microscope. Material in the specimen 22 that absorbs light, particularly cellular cytoplasm and granules, reduce the transmitted light, creating shadows. Thus, the bright-field image of cells in a clear medium is that of darker cells against a brighter background. Although contrast exists in a simple transmitted bright-field image, the contrast is less than is desirable for microsurgical manipulation of embryos.

Illustrated in FIG. 2B is a diagrammatic illustration of a transmitted dark-field illuminator 30 with respect to a stereo-microscope. In this case, the dark-field illuminator sources 71 emit light rays B that are directed through the specimen 22, but at an oblique angle so that directly transmitted dark-field illumination B does not enter the objective 18 of the microscope 14. Instead, dark-field illumination C that is scattered by surfaces of the specimen 22, typically the cytoplasm and granules of a cell, into the objective 18 to create the dark-field image. In a transmitted dark-field, the reflective objects, e.g., the cells, would appear light against a dark-field.

Represented in FIG. 2C is a combination bright-field and dark-field illumination system useful for examining embryos and detecting ova according to the method of the present invention. Bright-field sources 64 emit light rays A directly into the objectives 18 while dark-field sources 71 emit light rays B at an oblique angle to the objectives 18. The image that is seen is a combination of direct bright-field rays A and scattered darkfield rays C. Combined imaging with a dark-field and a bright-field using similar illumination would tend to cancel their effects. Accordingly, contrasting light is used herein for the dark-field and bright-field. In a particularly suitable combination, the bright-field illuminator 28 emits white or nearly white light whereas the dark-field illuminator 30 emits red to orange light, resulting in the cellular material glowing red to orange against a bright background. The red to orange color may be imparted to rays B from a white dark-field light source 71 by means of appropriate filters 73.

Figure 4:
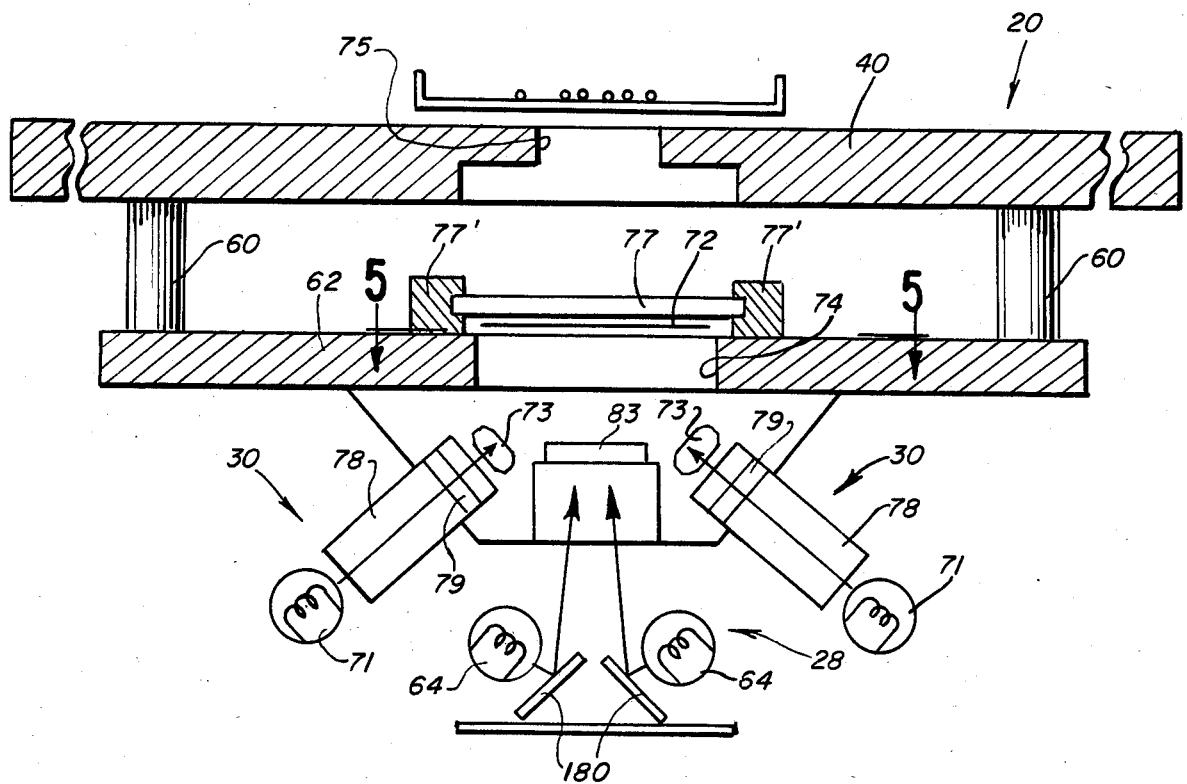
FIG. 4 is a more detailed cross-sectional view of a combination bright-field and dark-field illumination system embodying various features of the present invention.
Figure 5:
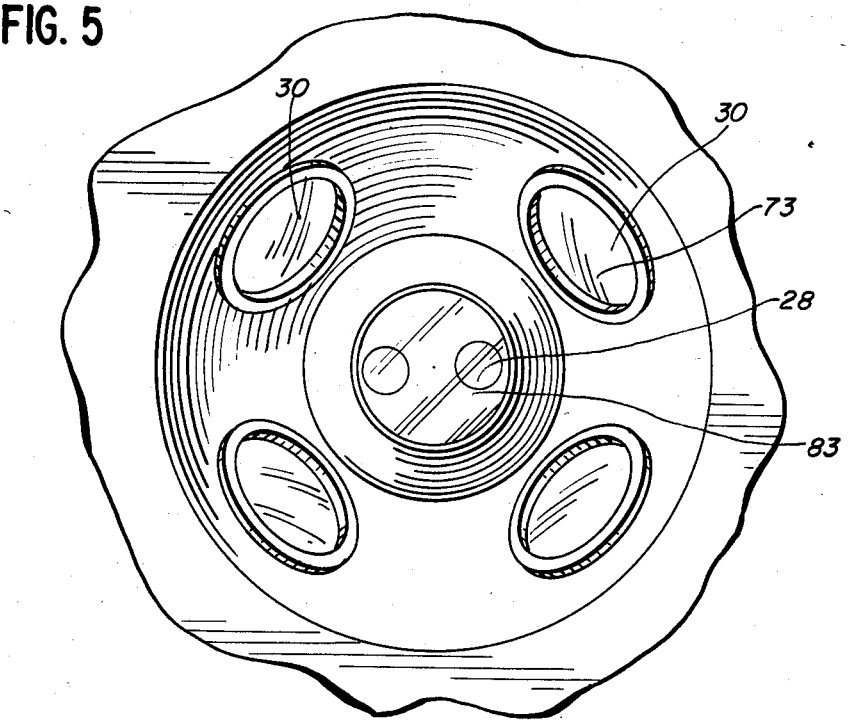
FIG. 5 is a view taken along line 5—5 of FIG. 4 showing a plan view of the illuminators.

An embodiment of a specimen stage 20 and illumination system for embryo examination is illustrated in greater detail in FIG. 4. The specimen 22 is contained in a petri dish 32 that rests on a base plate 40 aligned with a base plate viewing opening 75. The base plate 40 is supported by standoffs 60 above an adaptor plate 62 which carries an insertable aperture slit means 72 for narrowing the transmitted light path to a narrow slit over an adaptor plate illumination opening 74. The illuminator means 28, 30 are positioned below the adaptor plate and emit light that passes through the aligned openings 75, 74 of the plates 40, 62. Dark-field illumination is provided by four white light-emitting tungsten-halogen lamps 71 spaced 90° from one another at an oblique angle to the base plate opening. Light from each of the dark-field illuminator lamps 71 passes through a tube 78 that helps to direct the light at an angle to the objectives and in which is positioned a red to orange filter 79 that imparts the hue to the dark-field illumination. To ensure that dark-field illumination does not directly enter the objective 18, the dark-field source-emitted light is focused by lenses 73 at an oblique angle through the specimen 22 but away from the objectives.

The bright-field is provided by the two illumination sources or lamps 64 that emit light which travels a path directly into the objective. In the illustrated embodiments, the lamps 64 themselves are not aligned with the aperture and objective; instead, the lamps are mounted to the side and their illumination is reflected by mirrors 180 toward the objective. A light diffuser 83 is also interposed in the light path for more evenly distributing the light from the sources 64 to the specimen 22 and objective 18. The diffuser 83 may provide a tint, e.g., light blue, which enhances the contrast with the red to orange light of the dark-field.

Light rays from the illuminator means 28, 30 pass through an aperture slit adjustment (narrowing) mechanism 72, described in greater detail hereinafter, and through a heat absorbing filter 77. Where the illumination is provided by sources 64, 71, such as tungsten-halogen lamps, that emit substantial quantities of heat, a heat absorbing filter 77 is positioned by holders 77' above the adaptor plate opening 74. Excess heating is inconsistent with embryo health and viability, hence the filter 77 is necessary to limit the heating effects of the sources.

An important aspect of the invention is that the brightness of the bright-field illuminator 28 and dark-field illuminator 30 are each independently adjustable, whereby the image of the embryo can be optimized and/or the larger, more opaque embryo can be better contrasted from superflous cells. Power for both the dark-field lamps 71 and the bright-field lamps 64 is an AC electrical connection 80 (FIG. 7). A unit 82 selects the appropriate voltage, e.g., 120 or 240 V AC, and contains circuit-protecting fuses. A first dual primary transformer 84a converts the AC current to low voltage (e.g., 6 V) current which passes through a rheostat 86a to the bright-field light source 64. The rheostat 86a is adjusted by means of the knob 66 at the front of the stage 20 to continuously change the current over the output range of the lamps 64. Where two 6 V, 20 W lamps 64 are used to create the bright-field, the rheostat 86a may be a 1 ohm 50 watt resistor. A second dual primary transformer 84b also converts AC voltage to low voltage which is supplied through a rheostat 86b (e.g., 1 ohm, 100 watt) to the dark-field illuminators 71 (e.g., four 6 V 20 watt lamps).

Because embryos 12 are larger than the blastomeres and contain more cytoplasm and granules than do the blastomeres, a much stronger glow is emitted from the embryo than from the blastomeres. Contributing to the identification of the embryo is the zona pellucida 88 (FIG. 3) of the embryo 12 which is transparent and which appears as a clear white ring in the contrasting bright-field and dark-field illumination.

In viewing a specimen 22 expected to contain an ovum or an extracted embryo 12, the bright-field illuminator 28 is turned on until cell imaging appears. Then the contrasting dark-field illuminator 30 is turned on to a strength at which the cells glow clearly red to orange in a bright background field. To help identify the embryo 12, the bright-field may be adjusted to a higher intensity tending to wash out the image of the non-embryonic cells. Once the embryo is identified by its bright red to orange glow of its cell mass and by its clear white zona pellucida "halo", the relative intensities of the bright-field and dark-field are adjusted to optimize the contrast and clarity of the embryonic image. The continuous variability of the two fields permits the technician to adjust the image to that which is most distinguishable to him.

In accordance with an important aspect of the invention, depth of the field and contrast of the image is adjustable by positioning the slit adjustment means 72 in the bright-field light path, thereby changing the width of the aperture or slit 26 through which the bright-field illumination passes from the source 64, through the specimen 22 and to the objective or objectives 18. Narrowing the aperture 26 through which bright-field illumination passes from the illuminator 28 to the objective 18 of the microscope 14 increases the depth of field. For manipulating embryos, it is desirable to have capabilities of obtaining 150 microns of field depth at the embryo-observing magnification, which is typically between about 100 to about 400 power.

When a stereo-microscope 14 having two objectives 18 is used to view the specimen 22, the aperture 26 takes the form of an elongated slit extending across the dual light paths. A significant enhancement of depth of field is provided by placing the slit adjustment means 72 (shown in FIG. 6 from above through the transparent heat-absorbing filter 77) in the bright-field light path. The slit adjustment means 72 consists of an aperture plate 104 which is slidable forward and rearward along the adaptor plate 62 and a pair of blades 100, 102 carried by the aperture plate 104 spaced apart to provide a slit 26 of predetermined width along a line defined by the axes of the light paths of the two microscope objectives 18. As a means of attaching the aperture plate 104 to the adaptor plate 62, the aperture plate has an elongated slot 106 through which a pair of bolts 108 extend into threaded openings (not shown) of the adaptor plate. With the bolts 108 loose, the aperture plate 104 may be slid rearward to precisely center the slit 26 relative to the objectives 18 (as shown) or forward to remove the blade 102 from in front of the illumination sources. A stop plate 114 secured to the front of the stage 20 with a bolt 112 limits forward movement of the aperture plate, while abutment of the front end of the slot 106 against the forward bolt 108 limits rearward movement of the aperture plate. For viewing embryos or ova at magnifications of 100× or above, an aperture adjustment means 72 is used which provides a slit width of about ½ mm or less. To enable the microscope to be used for other purposes, e.g., to determine the presence of polar bodies in ova.

Once the bright-field and dark-field intensities are adjusted to clearly image the embryo 12 and the width of the slit adjustment means 72 is in place to assure that a sufficient depth of the embryo is visible, microsurgery is performed in the usual manner on the embryo 12. For example, in the photo of FIG. 3, a bovine embryo is shown being held by the probe 46a of a micropipette 44 under negative pressure and cut into two viable pieces with a microsurgical blade 44c. Viable fragments of this embryo 12 will be transplanted into the uteri of two or more cows and will develop into genetically identical calves.

The invention also facilitates in vitro fertilization of ova with sperm. The enhanced image contrast provided by the invention better enables the technician to locate ova from among cumulus cells, observe features of the ova and observe fertilization of the ova. Extracted ova located at the work station under a composite dark-field, bright-field. The located ova are exposed to sperm in vitro and fertilizations of the ova are observed under a microscope. Prior to fertilizing an ova, its maturity may be observed using only the bright-field illumination to detect its first polar body. When using only the bright-field, the aperture adjustment means 72 is moved to its forward position with the blade 102 removed from the light path. Sperm mobility as well as penetration may be observed using the contrasting bright-field and dark-field. Fertilization is observed by the appearance of a second polar body which appears much like the first polar body but occurs after penetration of sperm. Again, the polar bodies may be observed with bright-field illumination.

The advantages of the present invention may now be more fully appreciated. The invention provides for clear color imaging of embryos and ova which cannot be stained. Micromanipulating of the embryo or ovum is facilitated by the clarity of the image at a substantial field depth, making it easier to precisely position the tool in three dimensions.

While the invention has been described in terms of a preferred embodiment, modifications obvious to one with ordinary-skill in the art may be made without departing from the scope of the invention. For example, while excellent contrast has been found in the image produced by a white or nearly white transmitted bright-field and a red to orange transmitted dark-field, other color combinations of contrasting light and dark-field may be found to be suitable. Although the invention has been primarily described with reference to a work station utilizing a stereo-microscope, other microscopes, such as a compound microscope could be used, in which case, the slit would be replaced by a generally round aperture.

Various features of the invention are set forth in the following claims.

What is claimed is:

1. A work station for observing embryos or ova extracted from an animal comprising
   a microscope having an objective,
   a stage disposed below said objective for placement thereon of a specimen that contains an embryo or an ovum, said stage having an aperture aligned with said objective,
   bright-field illuminator means disposed below said stage for emitting light directly upward through said aperture, through the specimen positioned on said stage above said aperture and into said objective, and
   dark-field illuminator means disposed below said stage for emitting contrasting light directed upward through said aperture and through the specimen at an oblique angle at which the dark-field illuminator means-directed light does not enter said objective, while contrasting dark-field illuminator means-emitted light that is scattered by said specimen enters said objective, said bright-field illuminator means and said contrasting dark-field illuminator means being independently operable and being simultaneously operable, whereby illumination can be provided as bright-field, dark-field or a composite including a component of bright-field and a component of contrasting dark-field.

2. A work station in accordance with claim 1 also including means to continuously adjust the intensity of the light emitted by said bright-field illuminator means and means to continuously adjust the intensity of the contrasting light emitted by said dark-field illuminator means, whereby imaging of said embryo or ovum with bright-field and constrasting dark-field light from said illuminator means can be optimized.

3. A work station in accordance with claim 1 including means for adjusting the width of said aperture according to the depth of image field of the image of the embryo or ovum.

4. A work station in accordance with claim 3 wherein said microscope is a stereo-microscope, providing a magnification of at least 100×, said aperture is an elongated slit, and said slit is adjustable in width to provide a depth-of-field of at least about 150 microns in the observation range of magnification.

5. A work station in accordance with claim 3 wherein said microscope is a stereo-microscope providing a magnification of at least 100×, said aperture is an elongated slit, and said slit is adjustable to narrow to at least about a ½ mm width.

6. A work station in accordance with claim 1 wherein said dark-field illuminator means comprises a white light source and filter means for coloring the light emitted thereby.

7. A work station according to claim 6 wherein said bright-field illuminator means includes a white light source and said filter means colors light emitted by said dark-field, white light source to a red to orange hue.

8. A work station in accordance with claim 1 wherein said bright-field illuminator means comprises a light source and diffuser means disposed between said light source and said aperture for evenly distributing the light from said source.

9. A work station according to claim 1 including heat shield means for preventing excess heating of the specimen by said illuminator means.

10. A work station according to claim 1 also including tool means for manipulating the embryo or ovum and micromanipulator means for moving said tool means to perform the manipulations on the embryo or ovum.

11. A work station for performing micromanipulations on an embryo or an ovum extracted from an animal comprising
    a microscope having an objective,
    a stage disposed below said objective for placement of an ovum- or embryo-containing specimen thereon, said stage having an aperture aligned with said objective,
    means for adjusting the width of said aperture to adjust the depth-of-field of the microscopic image of the specimen,
    bright-field illuminator means disposed below said stage for emitting light directed upward through said aperture, through the ovum- or embryo-containing specimen positioned on said stage and into said objective,
    first means for adjusting the intensity of light emitted by said bright-field illuminator means,
    dark-field illuminator means disposed below said stage for emitting light directed through said aperture and through the specimen at an oblique angle at which said dark-field illuminator means-directed light does not enter said objective, while contrasting dark-field illuminator means-emitted light that is scattered by said specimen enters said objective, colored filter means associated with said dark-field illuminator means for coloring the light emitted thereby to contrast it with the light emitted by said bright-field illuminator means, second means for adjusting the intensity of light emitted by said dark-field illuminator means, said first and second means for adjusting being independently and simultaneously operable to provide illumination that is bright-field, dark-field, or a composite including an adjustable component of bright-field and an adjustable component of contrasting dark-field, tool means for manipulating on the embryo or ovum in said specimen, and micromanipulator means for moving said tool means relative to the embryo or ovum.

12. A method of manipulating an ovum or an early embryo that has been extracted from an animal comprising providing a microscope having an objective and an eyepiece, providing a stage positioned below said objective having an aperture aligned with said objective, placing a specimen that contains an ovum or an embryo on said stage above said aperture, creating a bright-field image in said microscope by directing light from below said aperture through said specimen and to said objective, simultaneously creating a dark-field image in said microscope by directing contrasting light from below said aperture, through said specimen and away from said objective so that only contrasting dark-field light scattered by said specimen enters the objective to create a dark-field image of the embryo or ovum that contrasts with the bright-field image, providing micro tools and micromanipulator means for moving said micro tools relative to said embryo or ovum, and performing manipulations on said embryo or ovum by operating said micromanipulator means while observing the composite dark-field and bright-field image of the embryo or ovum through said eyepiece of said microscope.

13. A method according to claim 12 including adjusting the relative intensities of bright-field light and dark-field light to optimize the composite image of the embryo or the ovum.

14. A method according to claim 12 including limiting the width of said aperture to obtain an image of said embryo or ovum of a depth-of-field conducive to performing three-dimensional micromanipulation.

15. A method according to claim 12 wherein said specimen contains an ovum, the ovum is observed in the contrasting dark-field and bright-field, sperm is provided to the observed ovum, and fertilization of the ovum is observed in the contrasting dark-field and bright-field.

16. A method according to claim 15 wherein mature ova are selected for fertilization by the presence of a polar body.

17. A method according to claim 16 wherein said polar body is observed under bright-field illumination.

* * * * *